United States Patent Office 2,992,113
Patented July 11, 1961

2,992,113
DRY FOOD MIX
James M. Gorman and Arthur C. Keith, Topeka, Kans., assignors to Seymour Foods, Inc., Topeka, Kans., a corporation of Kansas
No Drawing. Filed Aug. 11, 1958, Ser. No. 754,185
5 Claims. (Cl. 99—139)

The present invention is directed to a new and improved dry food mix and method of forming the same, the dry mix product being designed for liquid reconstitution as a custard mix or beverage.

It is an object of the present invention to provide a new and improved dry food mix suitable for use in preparing a custard for consumption as such or for use in the preparation of custard pie, the mix being further suitable for use in the preparation of a beverage of the egg-milk variety.

A further important object of the present invention is to provide a new and improved dry food mix which is prepared in dry blended form in an economical manner thus eliminating a blended product drying step of the type common to the preparation of many commercially used custard and beverage mixes.

Still another object is to provide a new and improved dry food mix for use in the preparation of custard and beverage, the mix exhibiting improved solubility in liquids during reconstitution thereof.

An additional object resides in the provision of a preferred method of preparing the dry food mix described in the foregoing objects, this method providing for dry blend preparation of the mix in an economical and efficient manner.

Other objects not specifically set forth will be apparent from the following detailed description of the invention.

There are several well known custard and beverage mixes available on the market at the present time, these mixes being in dry form for reconstitution upon the addition thereto of a suitable liquid. Such mixes are generally considered to fall within the category of dried egg yolk products, dry extended egg yolk products, or dry shortening products. As commonly practiced, these products are prepared by blending the normally liquid ingredients thereof prior to drying followed by the subjecting of the liquid or wet blend to suitable drying conditions. Such products will contain sugar, non-fat milk solids, hydrogenated vegetable oil and egg yolk solids in their final dried form. Liquid non-fat or whole milk and liquid egg yolks are blended with the sugar and oil to form a uniform mix which is then subjected to suitable drying to complete the preparation of the product. It will be appreciated that considerable care must be taken to maintain uniformity in a product prepared in this manner as the dried solids constituting the final ingredients are added and calculated on a liquid basis during the preparation of the product. Additionally, considerable care must be taken during the drying process to avoid heat damage to the different ingredients as well as to be assured of uniform and complete drying of the product without subsequent caking or undesirable lumping during merchandising. With these problems existing, it is not always possible to utilize the most efficient drying procedures as special precautions must be taken to guard against heat damage or non-uniform product production.

The dry mix product of the present invention is prepared by blending the principal ingredients thereof in their pre-dried form with the particular sequence of blending of these ingredients as well as the combination of ingredients used permitting complete elimination of the problems arising from liquid blending followed by drying while additionally providing for improved solubility during reconstitution. It has been found that with the use of pre-dried egg white solids, flour, sugar, pre-dried non-fat milk solids and a suitable hydrogenated fatty oil, an improved dry food mix may be prepared in the efficient and economically improved dry blended form. It has further been found that this basic product may have added thereto pre-dried egg yolk solids without sacrificing the advantages accompanying dry blending and without sacrificing the requisite properties of stability and improved reconstitution during merchandising and use of the product.

The following are examples of the dry mix product of the present invention.

Example I

|  | Percent |
|---|---|
| Egg white solids | 9.6 |
| Sugar | 46.5 |
| Salt | 0.5 |
| Flour | 1.6 |
| Hydrogenated vegetable oil | 15.5 |
| Non-fat milk solids | 26.3 |
|  | 100.0 |

Example II

| | |
|---|---|
| Egg white solids | 5.60 |
| Sugar | 46.50 |
| Salt | 0.53 |
| Flour | 1.60 |
| Hydrogenated vegetable oil | 10.42 |
| Non-fat milk solids | 22.25 |
| Egg yolk solids | 13.10 |
| | 100.00 |

In the foregoing examples, the egg white solids used are preferably low bacteria egg white solids to minimize bacterial build up in the reconstituted mix in the form of a pie or drink in the event of improper handling following reconstitution. Similarly, the egg yolk solids of Example II are preferably pasteurized and stabilized by enzyme conversion prior to drying. This latter treatment of the egg yolk solids additionally functions to extend the shelf life of the dry mix. Enzyme conversion is well known as, for example, by utilization of a glucose-oxidase system. The non-fat milk solids are used in preference to whole milk solids for purposes of product stability. The flour used is preferably tapioca flour. Artificial coloring may be added to the egg whites and egg yolks prior to the drying thereof to improve dispersion of color in the mix and provide the same with a uniformly attractive color.

A dry mix product incorporating the formula of Example I is preferably prepared by creaming the vegetable oil into the sugar followed by blending with this mixture the egg white solids, salt, flour and non-fat milk solids in the order specified. Dry mixing of the formulation of Example II is preferably carried out by creaming the vegetable oil into the sugar followed by addition thereto of the egg white solids, flour, salt, egg yolk solids and non-fat milk solids in the order specified. In following these procedures it has been found that a uniformly blended improved dry mix product is obtained.

The dry mix product of the present invention is especially suited for reconstitution with warm water in the preparation of a beverage, custard or custard pie filling. Exemplary of reconstitution of the product, it is preferable to add 2½ cups of warm water at about 130° F. to about 6.6 ounces (187 gms.) of mix. The dry mix may be placed in a mixing bowl for this purpose with one cup of the warm water being gradually added thereto during mixing to disperse the dry ingredients. The remaining 1½ cups of warm water are then added during mixing at medium speed until the mixture is uniform. As a drink the reconstituted mix may be served either warm or chilled. For use as a pie filling the reconstituted mixture may be poured into an unbaked pie shell and baked about 40 minutes at 350° F. The reconstituted mix exhibits excellent baking properties as well as fast uniform dispersion upon reconstitution.

A further improvement residing in the dry blended mix of the present invention arises from the dry blending of sugar (sucrose) with the dried egg yolk used in the product of Example II. As described above, custard and beverage mixes have been prepared by first mixing the ingredients including those in liquid form followed by drying the liquid or semi-liquid mixture. It has been found that drying egg yolks mixed with sucrose results in the development of "fishy" off-odors and flavors following storage of the dried product. Such odors and flavors would be developed in the product of Example II following a reasonable period of storage if the egg yolks were dried in the presence of sucrose. This problem is alleviated by dry blending the ingredients of the present invention.

Obviously certain modifications and variations of the invention as hereinbefore set forth may be made without departing from the spirit and scope thereof, and therefore only such limitations should be imposed as are indicated in the appended claims.

We claim:

1. The method of preparing a blended dry mix custard and beverage product which consists essentially of low bacteria egg white solids, flour, sugar, unsaturated fatty oil and non-fat milk solids, said method comprising creaming the unsaturated fatty oil into the sugar, and thereafter blending with the combined oil and sugar the remaining ingredients.

2. The method of claim 1 wherein the remaining ingredients are blended with the combined oil and sugar in the consecutive order of egg white solids, flour and non-fat milk solids.

3. The method of preparing a blended dry mix custard and beverage product which consists essentially of low bacteria egg white solids, flour, sugar, unsaturated vegetable oil pasteurized and glucose converted, egg yolk solids, and non-fat milk solids, said method comprising creaming the unsaturad vegetable oil into the sugar and thereafter blending with the combined oil and sugar the remaining ingredients.

4. The method of claim 3 wherein the remaining ingredients are blended with the combined oil and sugar in the consecutive order of egg white solids, flour, egg yolk solids and non-fat milk solids.

5. The product prepared by the method of claim 1.

References Cited in the file of this patent

UNITED STATES PATENTS

| | | |
|---|---|---|
| 1,266,201 | Boddington | May 14, 1918 |
| 2,221,563 | Young | Nov. 12, 1940 |
| 2,271,654 | Littlefield | Feb. 3, 1942 |
| 2,598,282 | Melnick | May 27, 1952 |
| 2,874,050 | Arenson et al. | Feb. 17, 1959 |

FOREIGN PATENTS

| | | |
|---|---|---|
| 8,950 | Great Britain | 1911 |